US007904819B2

(12) United States Patent
Cohen et al.

(10) Patent No.: US 7,904,819 B2
(45) Date of Patent: Mar. 8, 2011

(54) SELF-CONFIGURING COMPONENT FOR RECOGNIZING AND TRANSFORMING HOST DATA

(75) Inventors: Gabriel Aaron Cohen, Raleigh, NC (US); Gerald Laverte Mitchell, Jr., Raleigh, NC (US); William A. Smythe, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1235 days.

(21) Appl. No.: 10/727,275

(22) Filed: Dec. 3, 2003

(65) Prior Publication Data

US 2005/0125735 A1    Jun. 9, 2005

(51) Int. Cl.
*G06F 3/00*     (2006.01)
*G06F 3/01*     (2006.01)

(52) U.S. Cl. ......... 715/746; 715/744; 715/745; 715/749; 715/788; 715/790

(58) Field of Classification Search .................. 715/746, 715/762, 742, 749, 513, 744, 745, 788, 790
See application file for complete search history.

(56) References Cited

U.S. PATENT DOCUMENTS

| | | | | | |
|---|---|---|---|---|---|
| 5,754,830 | A | * | 5/1998 | Butts et al. ................ | 719/311 |
| 5,905,866 | A | * | 5/1999 | Nakabayashi et al. ........ | 709/223 |
| 5,940,075 | A | * | 8/1999 | Mutschler et al. ............ | 715/760 |
| 5,958,013 | A | * | 9/1999 | King et al. ................ | 709/227 |
| 6,061,694 | A | | 5/2000 | Janay et al. ............... | 707/507 |
| 6,223,180 | B1 | | 4/2001 | Moore et al. ............... | 707/100 |
| 6,253,244 | B1 | | 6/2001 | Moore et al. ............... | 709/231 |
| 6,295,075 | B1 | | 9/2001 | Janay et al. ............... | 345/747 |
| 6,449,649 | B1 | | 9/2002 | Janay et al. ............... | 709/227 |
| 6,704,024 | B2 | * | 3/2004 | Robotham et al. ........... | 345/581 |
| 7,281,236 | B1 | * | 10/2007 | Galvin et al. ............... | 717/104 |
| 7,461,385 | B2 | * | 12/2008 | Winter ........................ | 719/328 |
| 7,467,375 | B2 | * | 12/2008 | Tondreau et al. ............ | 717/137 |
| 7,490,031 | B1 | * | 2/2009 | Qiu .............................. | 703/22 |
| 2002/0120725 | A1 | * | 8/2002 | DaCosta et al. ............. | 709/221 |
| 2003/0193521 | A1 | * | 10/2003 | Chen et al. .................. | 345/762 |
| 2004/0226027 | A1 | * | 11/2004 | Winter ........................ | 719/328 |
| 2005/0038876 | A1 | * | 2/2005 | Chaudhuri ................... | 709/219 |
| 2005/0177785 | A1 | * | 8/2005 | Shrader et al. .............. | 715/513 |
| 2005/0267943 | A1 | * | 12/2005 | Castaldi et al. .............. | 709/206 |

OTHER PUBLICATIONS

"Optimizing Host application Presentation Space Recognition Events through Heuristic Comparison", IBM Research Disclosure Article, Author: Brian Webb, Greg Knowles and Brad Marchesseault, Published Dec. 2000, article # 196, Issue 440.
"Optimizing Host Applications Presentation space Recognition Events through Matching Prioritization", U.S. Appl. No. 09/531,239, filed Mar. 21, 2000.

* cited by examiner

*Primary Examiner* — Weilun Lo
*Assistant Examiner* — Nicholas Augustine (57) ABSTRACT

An improved technique is provided for recognizing a character based user interface having several host component types and transforming the character based user interface to a web enabled user interface. Agents are deployed to consume a character stream which composes the character baded user interface. Each agent scans the character based user interface to determine which host component types exist in the character based user interface. Each agent is specifically designed to determine the existence of a different host component type from the other agents. When an agent fins a host component type, a match region is defined containing the characters of the found host component type. Each agent renders their associated match regions to compose the web enabled user interface.

17 Claims, 7 Drawing Sheets

Work with All Spooled Files — 210

Type options, press Enter.
  1=Send      2=Change      3=Hold      4=Delete      5=Display      6=Release      7=Messages
  8=Attributes    9=Work with printing status

| Opt | File | User | Device or Queue | User Data | Sts | Total Pages | Page Copy |
|---|---|---|---|---|---|---|---|
|  | QPQXPRTF  | WHIDEMO | QPRINT    |            | RDY | 1 | 1 |
|  | QPQXPRTF  | WHIDEMO | QPRINT    |            | RDY | 1 | 1 |
|  | QSYSPRT   | WHIDEMO | QPRINT    |            | RDY | 1 | 1 |
|  | QPDSPAJB  | WHIDEMO | QPRINT    |            | RDY | 7 | 1 |
|  | QPDSPAJB  | WHIDEMO | QPRINT    |            | RDY | 7 | 1 |
|  | QPQXOBJPF | WHIDEMO | QPRINT    |            | RDY | 3 | 1 |
|  | QPJOBLOG  | WHIDEMO | QIWA015080 | QPADEV0015 | RDY | 2 | 1 |
|  | QPQXPRTF  | WHIDEMO | QPRINT    |            | RDY | 1 | 1 |
|  | QPRTLIBL  | WHIDEMO | QPRINT    |            | RDY | 1 | 1 |

More . . . .

Parameters for options 1, 2, 3 or command
===>

| F3=Exit | F10=View 4 | F11=View 2 | F12=Cancel | F22=Printers | F24=More keys |
| 250A | 250B | 250C | 250D | 250E | 250F |

710 — Deploying agents having a component object and a widget object to consume an entire host screen.

720 — Scanning the host screen. Each component object of each agent scans the entire host screen determining whether one or more regions on the host screen have characteristics which may indicate a match with the type of host interface paradigm each component is designed to recognize.

730 — Storing properties defining the matched regions within each agent.

740 — Determining whether any matched regions associated with one agent overlaps other matched regions associated with another agent.

750 — Resolving conflicts between overlapping regions to define non-overlapping matched regions.

760 — Outputting each non-overlapping matched region into a web interface format according to the matched region's associated agent's widget object.

SELF-CONFIGURING COMPONENT FOR RECOGNIZING AND TRANSFORMING HOST DATA

FIELD OF THE INVENTION

The present invention relates generally to improved apparatus and methods for automatically recognizing and transforming user interface paradigms between software systems, and, more particularly, to advantageous techniques for providing automatic self-configuring software components for recognizing paradigms used in legacy host interfaces and transforming host paradigms to paradigms used in content browser interfaces such as a web browser.

BACKGROUND OF THE INVENTION

Many legacy software host applications exist today which are relied upon by many companies to perform their mission critical operations. Over time, many man hours have been invested in these host applications in the form of maintenance and new feature enhancements. These applications have proven to be reliable and due to their long term use address practically any user scenario that may arise. However, these host applications typically have character based user interfaces. Due to the growth of the world wide web and the prevalent use of graphical web interfaces by the general public, companies reliant on these host applications are typically pressured to expose access to the host application via a world wide web interface which is typically supported by a content browser such as a web browser.

The term "web to host integration" means presenting in real time a user interface which is displayed in a web browser. The user interface communicates and integrates with a legacy host user interface in order to extend usability, functionality, and life of the underlying legacy host application. In providing a web to host integration, particular challenges arise. One challenge includes automatically recognizing differing host components that may appear on a host screen. A second challenge is how to efficiently transform host data extracted from the host user interface so that the presentation of the host data at the web user interface can be manipulated by a user in a fashion which utilizes the features of a graphical user interface. The manipulated data on the web user interface is translated as though it was performed on the host user interface directly.

For example, a legacy host interface typically composes many screens where each screen has many host user interface components. One host component may require a user to make a selection from a list of potential options. Typical legacy host interfaces require a user to make a selection by tabbing a screen cursor to a desired field, inputting a character, and pressing the enter key to effect the selection. Using a web interface such as one developed in Java®, XML, Javascript®, or the like, a user would typically highlight a radio button by the desired selection with a mouse and click the mouse button. The challenge is to recognize in real time that the legacy host screen requires a selection paradigm and to provide a corresponding web interface which presents the same data in substantially the same location on a screen while providing a selection capability in its own paradigm, highlighting a radio button, for example. When multiple host user interface paradigms are present in a host screen, coordinating the transformation between different corresponding web interface paradigms becomes problematic.

Many efforts have been made to address these and other problems associated with web to host integration. Some prior improvements remedy to some degree some of the shortcomings mentioned above, but none, until the present invention, has effectively solved a majority of these problems. For example, one approach is to utilize predefined maps of the host interface. Software developers of the host application typically publish these predefined maps. Based on these predefined maps, programmers use tools such as IBM's WebFacing to develop a web interface before the solution is deployed. A second approach, for example, IBM's Host Publisher XML gateway, involves tapping protocol information carried in a data stream between the host interface and the host computer to recognize some basic interface components such as text, input fields, and password fields. These basic components are explicitly indicated in the protocol. Once the particular indication is read from the protocol, a predefined transformation to a web interface is performed. A third approach expands the second approach by also hard coding predetermined transformations of specific components not explicitly noted within the data stream such as input received through function keys. However, to recognize these more complex components, a programmer needs to specify where a field is expected to reside in a screen typically by using a predefined template.

Clearly, due to the increasing cost of software development, systems and methods are needed to achieve web to host integration with greater efficiency and flexibility to handle more complex user interface paradigms by automatically recognizing host interface paradigms and automatically transforming those paradigms to create and display a graphical interface for the underlying host application.

SUMMARY OF THE INVENTION

Among its several aspects, the present invention provides apparatus and methods for recognizing a character based user interface and transforming the character based user interface to a web enabled user interface. In so doing, the present invention deploys multiple agents to scan a character stream which is representative of a host screen. Each agent, a program code module, is responsible for finding a particular host component in a presently host user interface screen. Each agent considers the context of characters within a screen to determine the particular host component. Using a contextual approach allows agents to recognize complex host components not explicitly specified in the host protocol. Further, each agent is responsible for converting any found host components of the type it is responsible for finding to a corresponding web browser enabled user interface paradigm, or widget. When each agent reads the character stream, characteristics of any found host components such as the region which defines where on the host screen a host component is found are indicated and temporarily saved. Since many host components have similar features such as a text field and a list field, for example, it is possible for multiple agents to interpret the same parts of the screen as different host components. Once all of the agents have found their specific host component and reconciled any differences, if any, each agent converts its specifically found host components to widgets. The outputted widgets compose a web enabled user interface which is rendered at an end user's computer.

A more complete understanding of the present invention, as well as further features and advantages of the invention, will be apparent from the following Detailed Description and the accompanying drawings.

DETAILED DESCRIPTION

Figure 1:
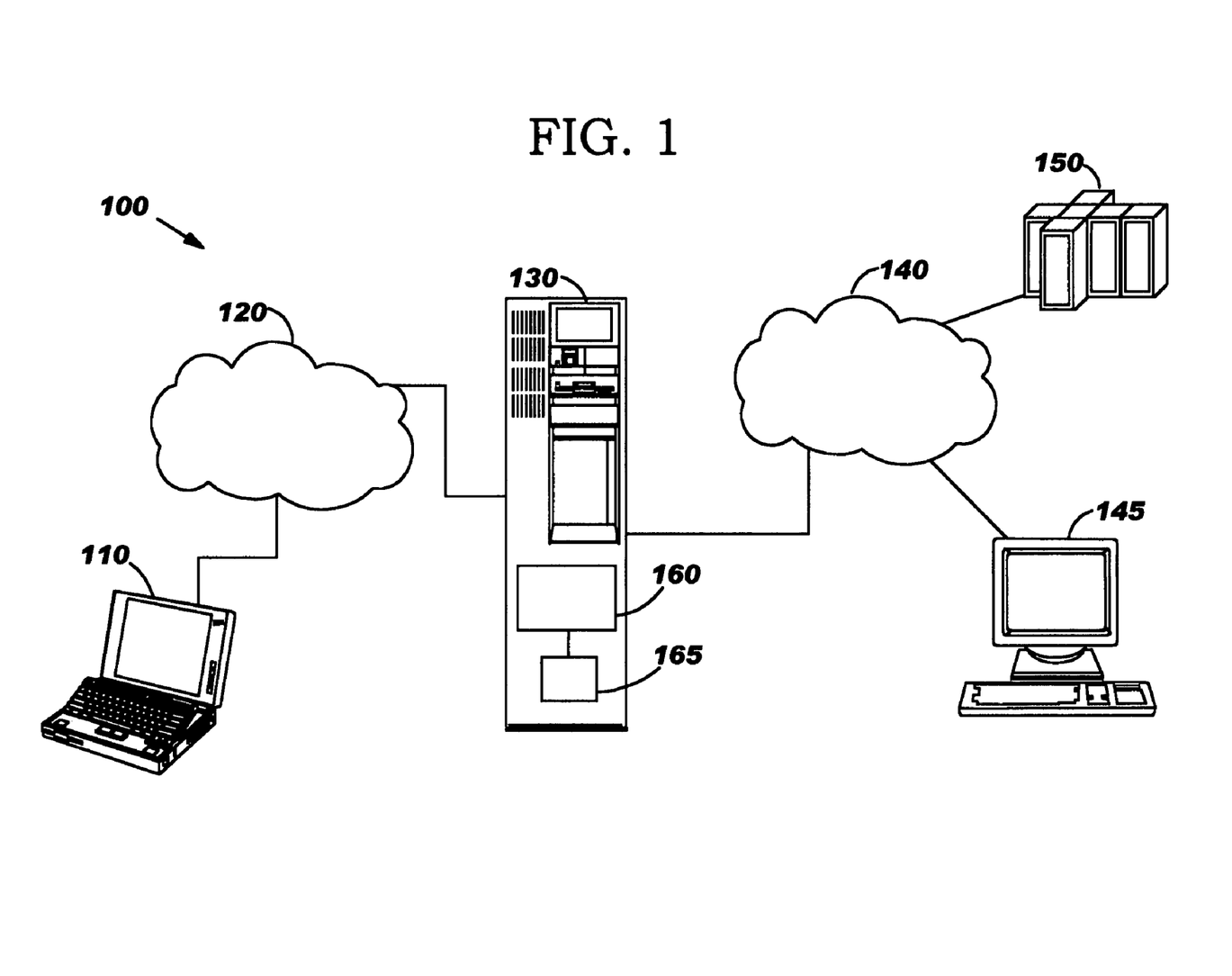
FIG. 1 illustrates an exemplary network in which the present invention may be advantageously employed.

FIG. 1 illustrates an exemplary network 100 having an end user computer 110, a host server 130, a host 150, and a host terminal 145. The end user computer 110 and the host server 130 communicate over subnetwork 120. The host server 130 and the host 150 communicate over subnetwork 140. Host server 130 employs the present invention embodied as program code 160 interfacing with host terminal session program code 165. For example, IBM's Websphere® host on-demand product or the like may suitably be employed as the host terminal session program code 165. Host server 130 has a processor for invoking program code instructions, memory for storing program code instructions, and a communication bus for the processor to retrieve instructions or data stored in memory. Subnetwork 120 may include a local area network (LAN), a wide area network (WAN), Internet, or the like and may employ a network protocol including transaction control protocol/internet protocol (TCP/IP) or the like. Subnetwork 140 may include a LAN or WAN and employ different enterprise network architectures including system network architecture (SNA), Digital Equipment network (DecNet), or the like. Although only one end user computer and one host server are illustrated as being connected to subnetwork 120, it should be noted that many computers and host servers may and typically will be connected to subnetwork 120. Likewise, although only one host server, one host, and one host terminal are illustrated as being connected to subnetwork 140, it should be noted that many host servers, hosts, and host terminals may and typically will be connected to subnetwork 140. Those of ordinary skill in the art will appreciate that the implemented exemplary computer network depicted in FIG. 1 may vary, and that the depicted example is solely for illustrative purposes and is not meant to imply architectural limitations with respect to the present invention.

As addressed in greater detail below, to dynamically present a web interface for a legacy application, program code 160 runs on host server 130. The host terminal session 165 provides the host user interface of a legacy host application running on host 150. Traditionally, an end user accesses the host 150 and its applications through a host terminal 145. The host terminal 145 would provide host screens through which the end user would interact. The host terminal 145 communicates over network 140 with the host 150.

For an end user operating computer 110 to interact with a host application resident at host computer 150, the end user uses a graphical interface on computer 110 such as a web browser to connect to program code 160 through a web server. During operation of the legacy host application, the program code 160 deploys multiple agents to scan a host screen presented at the host terminal session 165 to capture information present on the screen. Each agent recognizes a different host user interface paradigm, or host screen component, such as a list, a table, an input field, a text field, or the like. Each agent knows how to transform the recognized paradigm into a corresponding web browser enabled user interface paradigm, or widget. Upon completion of the screen scan by the agents, each agent renders itself into a format which may be employed as a web form, for example. The term "web form" as used herein means any web page which allows a user to input data which is then sent to a host server such as host server 130. Specifically, a JavaServer® page (JSP) contains each agent's output. Further details regarding outputting to a JSP page for use in conjunction with the present invention are found in U.S. application Ser. No. 10/120039 entitled "Rapid GUI Refacing of a Legacy Application" filed on Apr. 10, 2002 which is incorporated by reference herein in its entirety. Sun Microsystems'® Java 2 Platform Enterprise Edition (J2EE™) technology converts the JSP page to constitute the web form. The web form is communicated to the end user computer 110 over subnetwork 120 to be displayed in a web browser running on the end user computer 110.

It should be understood that although in the preferred embodiment of the invention the program code is implemented in software, in other embodiments of the invention all or portions of the instruction steps executed by these software portions may be resident in any of these components in firmware or in other program media in connection with one or more computers, which are operative to communicate with host server 130 and end user computer 110.

Figure 2:
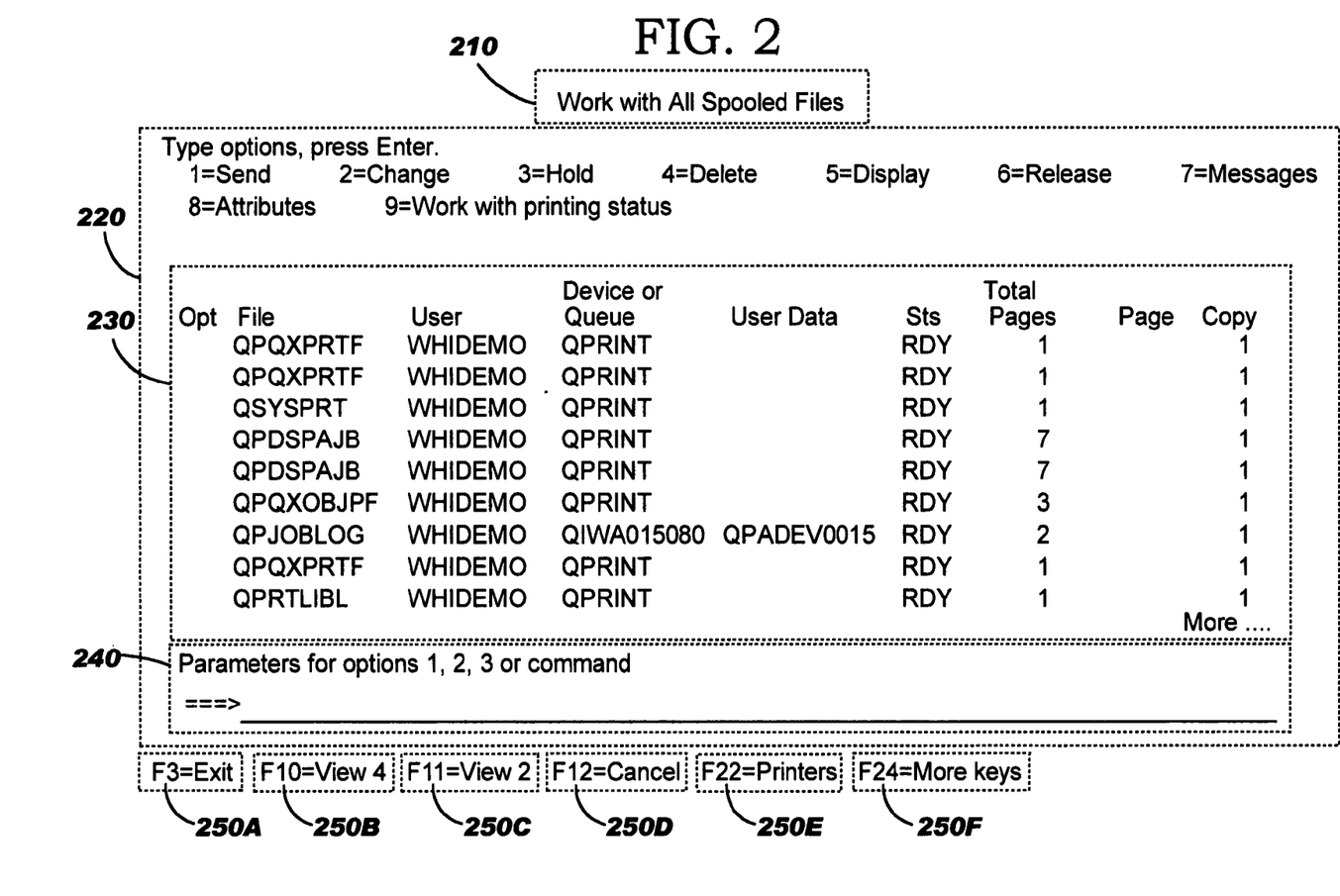
FIG. 2 illustrates an exemplary legacy host screen upon which the present invention may advantageously process.

FIG. 2 illustrates an exemplary legacy host screen 200 upon which the present invention processes. Regions 210, 220, 230, 240, and 250A-250F are areas on the host screen which have been recognized by deployed agents where each agent contains program instructions capable of recognizing a different host component as described further in connection with the discussion of FIG. 6. For example, region 210 is a region recognized by a text field agent, region 220 is a region recognized by a subfile agent, region 230 is a region recognized by a table agent, region 240 is a region recognized by an input field agent, and regions 250A-250F are regions recognized by a function key agent. The host screen comprises a stream of characters. Each agent contains programmed attributes which define characteristics to search in the character stream. For example, a function key field may demarcate a function key region whose beginning is defined by a capital "F" followed by a number, such as F3, F4, or the like, and whose ending is defined by a space character. The deployed agents scan the entire host screen. The character stream contains characters which may be displayable or non-displayable, the non-displayable characters also being known as attribute characters. Agents search the entire screen by reading the character stream. In so doing, each agent scans for characteristics of the read characters to determine whether the scanned characters represent a host component which matches a host component type for which the individual agent is searching. For example, a function key agent searches the host character stream until one or more characteristics representing a searched region reflects a function key component. The function key agent continues scanning the host character stream searching for the next matching region of a function key component until the entire character stream is scanned. Meanwhile, the input field agent scans the same host character stream until one or more characteristics representing a scanned region reflects an input field component. An input field agent recognizes an input host component, for example, by reading an attribute character which indicates that the subsequent characters in the stream are changeable. The term "consumed" when used herein means the act of scanning a host character stream and determining whether a set of the scanned characters represent a host component which matches the host component type for which the particular agent is searching. Once an agent has consumed an entire host character stream representing one screen, the agent temporarily stores indicators representing the regions which match its host component type.

While one skilled in the art would recognize the exemplary legacy screen 200 as a mid-range computing application, the invention is not so limited and any legacy application can be utilized in conjunction with the invention. By way of example, such applications may include not only mainframe applications, but also Windows based client-server applications, transforming one web interface to another web interface, and the like.

Figure 3:
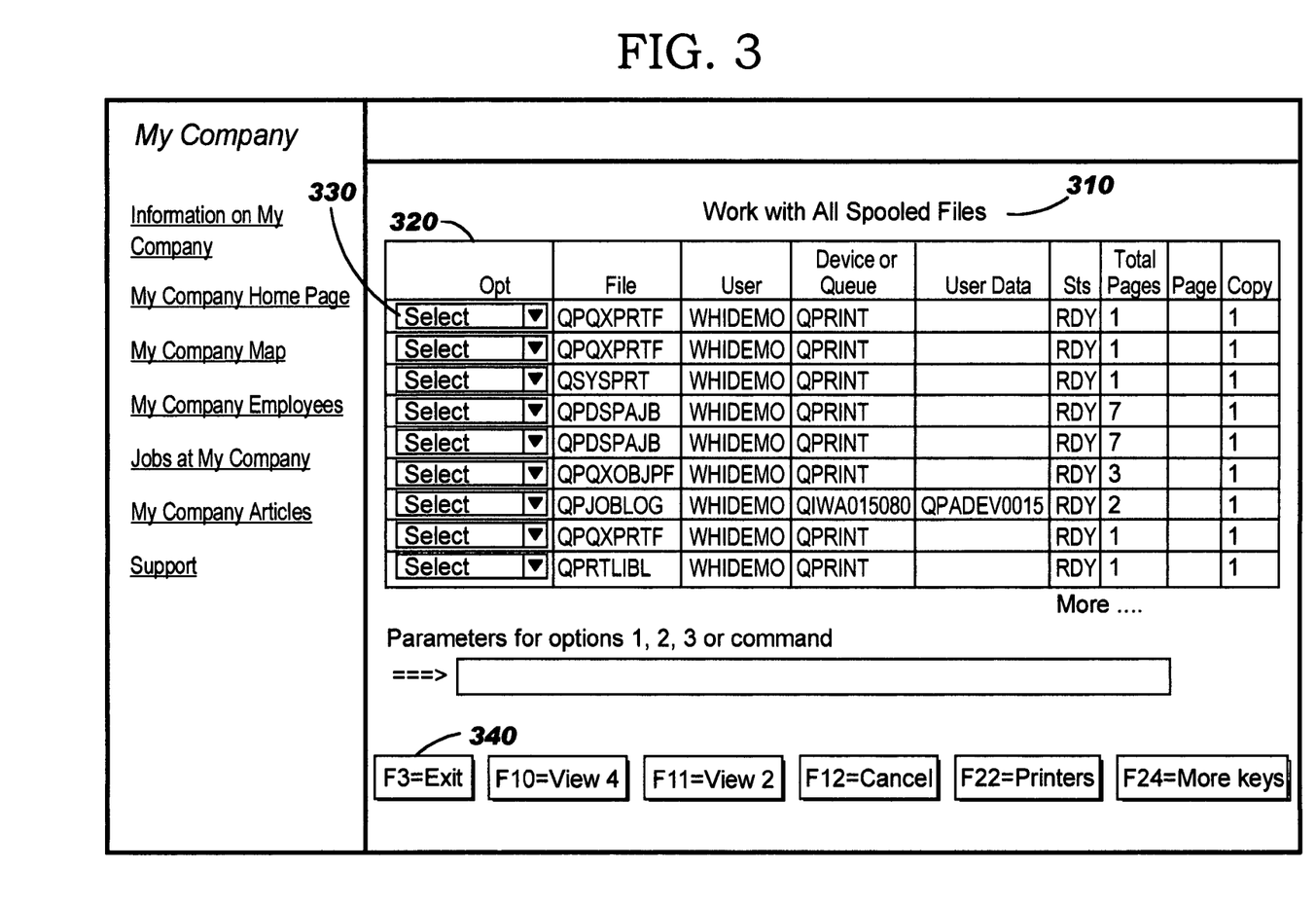
FIG. 3 illustrates an exemplary web browser enabled user interface resulting from transforming the legacy host screen of FIG. 2 in accordance with the present invention.

FIG. 3 illustrates an exemplary web browser enabled user interface 300 resulting from transforming the legacy host screen 200 in accordance with the present invention. Region 310 illustrates the output of the text agent which consumed region 210. Region 320 illustrates the output of the table agent which consumed region 220 of the host screen. Region 330 illustrates a drop down selectable menu which was outputted by the table agent. Region 340 illustrates the output of the function key agent which consumed region 250A. Once all the deployed agents have consumed the character stream and resolved potential conflicts as described further below in connection with the discussion of FIG. 4, the agents output the consumed regions into a web enabled format such as hypertext markup language (HTML), extensible markup language (XML), or the like. The outputted format is transmitted to an end user's computer and is readable by a typical web browser such as Netscape Navigator®, Internet Explorer, or the like and can thus be displayed at the end user's computer 110. FIG. 3 illustrates the results of the present invention's advantageous approach of deploying different agents tailored to consume different types of host components in order to create a default web interface without any additional programming or prior knowledge of a legacy host application interface by the end user or someone practicing the invention.

Included in the outputted format is a mapping of the host component. By advantageously carrying this host component mapping of the input host components consumed by the agents in the outputted format, any interaction the end user makes with the outputted format is readily converted and used as input for the corresponding host component. By way of example, the outputted format includes the mapping of hot link 320 to function key F13. If the end user clicks a mouse cursor on the hot link 320, a request is sent to the program code 160 containing an indication that function key F13 has been selected. Once the program code 160 receives the request, the program code 160 without the need of any agents forwards an indication to screen 200 that function key F13 has been selected through the host terminal session 165.

Figure 4A:
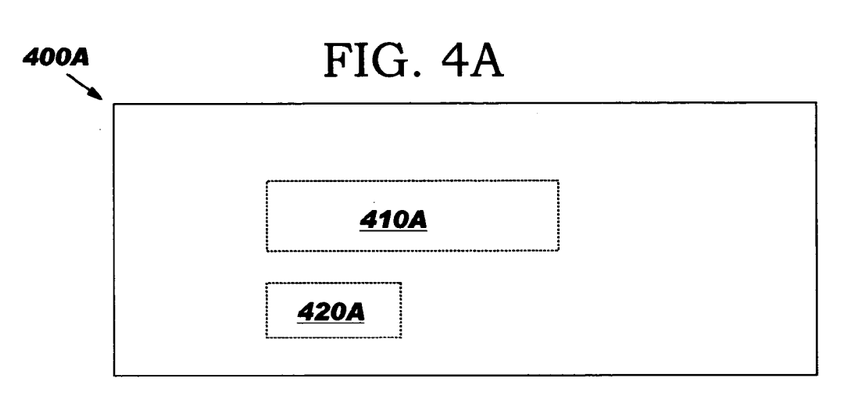
FIG. 4A illustrates a host screen at time $t_0$ where two regions have been recognized by two agents in accordance with the present invention.
Figure 4B:
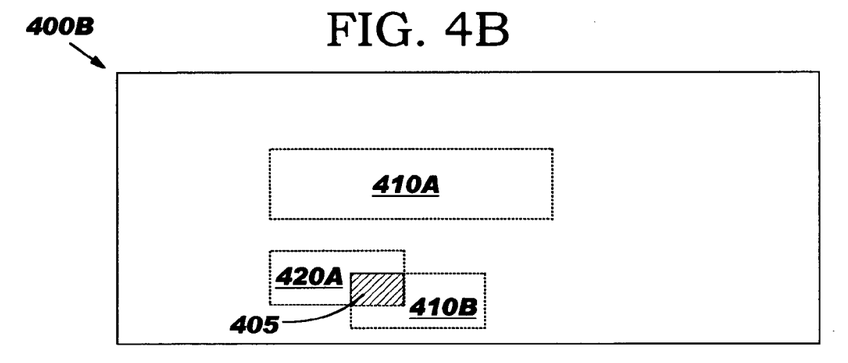
FIG. 4B illustrates the host screen of FIG. 4A at time $t_1$ where two overlapping regions have been recognized by two agents in accordance with the present invention.
Figure 4C:
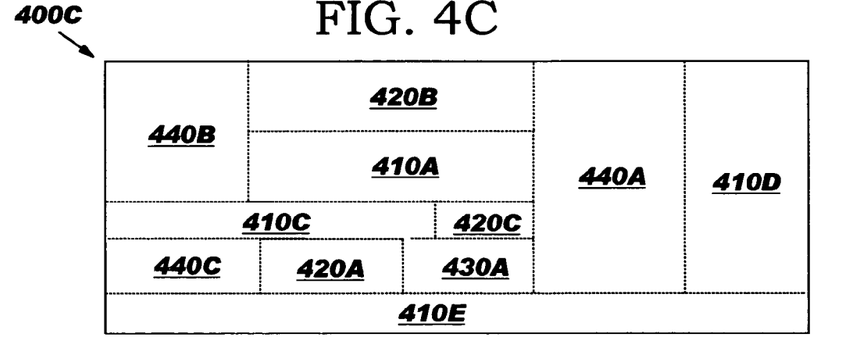
FIG. 4C illustrates the host screen of FIG. 4A at time $t_2$ after all deployed agents have consumed the screen and resolved any conflicts in accordance with the present invention.

FIGS. 4A-4C illustrate an exemplary host screen which has logically been consumed by multiple agents at sequential time points $t_0$, $t_1$, and $t_2$. FIG. 4A illustrates the host screen 400A at time $t_0$ where two regions 410A and 420A have been recognized by two agents in accordance with the present invention. For example, a text field agent, such as an agent out of a group of agents 520 of FIG. 5, consumed region 410A and an input field agent, such as an agent out of the group of agents 520 of FIG. 5, consumed region 420A. In this case, the regions 410A and 420A consumed by these two agents are non-overlapping and thus do not conflict.

FIG. 4B illustrates the host screen 400B of FIG. 4A at time $t_1$ where two overlapping regions 410B and 420A have been recognized by two agents in accordance with the present invention. In this illustration, text field agent consumed region 410B which overlaps region 420A consumed by the input field agent. The regions 420A and 410B conflict with one another over an overlapping region 405 shown in FIG. 4C with cross-hatching, also known as a conflict region. Regions 420A and 410B are therefore considered conflicting regions. The present invention provides several advantageous techniques for resolving such conflicts.

In one technique, a predetermined priority is assigned to each agent. When a conflict arises, the agents compare their predetermined priority. The agent having the higher predetermined priority would gain control over the conflict region. Furthermore, the lower priority agent may optionally either relinquish control of its entire region, for example region 410B, for subsequent consumption by another agent or relinquish control of only the conflict region 405.

A second technique involves comparing the size of the region consumed by each of the agents in conflict. For example, the size of region 420A would be compared to the size of region 410B. With this technique, the agent controlling the smaller sized region retains control over the conflict region 405. The agent which consumed the larger size region may optionally either relinquish control of its entire region or relinquish control of only the conflict region.

A third technique includes assigning a dynamic priority to each consumed region based on the projected amount of time the processor would expend to render the consumed region by each consuming agent in conflict. With this technique, the conflicting agent which would render its controlled region faster retains control over the conflict region 405. The conflicting agent which would expend more time to render its region may optionally either relinquish control of its entire region or relinquish control of only the conflict region.

Rather than resolving conflicts between agents as discussed above by the conflicting agents themselves, it will be recognized and contemplated by the present invention that such resolution may be implemented by a manager software component who manages all the agents.

When a conflicting agent loses during resolution, the losing agent may negotiate with the winning agent whether to relinquish control of only the conflict region or its entire region including the conflict region. Such negotiation may depend on the size of the conflict region or the agent types themselves. For example, a selection list agent may recognize a region containing a text label while a input field agent recognizes an input field which also includes the same text label. Since the essence of the input field agent is to recognize input areas, the text label is not essential to the input field. In this example, the input field agent would relinquish control of the conflict region, the text label, but would maintain control of the input field area.

FIG. 4C illustrates an exemplary host screen 400C of FIG. 4A at time $t_2$ after all deployed agents have consumed the screen and resolved any conflicts in accordance with the present invention. After all the different agents including a list agent, a table agent, an input field agent, a text field agent, and the like have consumed the character stream representing the host screen and resolved any conflicts between agents, the agents will control non-conflicting regions which may span the entire screen. For example, regions 410A, 410C, 410D, and 410E represent regions controlled by the text field agent, regions 420A-420C represent regions controlled by the input field agent, region 430A represents the region controlled by the table agent, and regions 440A-440C represent the regions controlled by the list agent. As illustrated in FIG. 4C, multiple regions controlled by an individual agent may be noncontiguous.

It should be recognized and it is contemplated by the present invention that the region arrangement displayed in FIG. 4C may be achieved by other techniques than deploying agents to consume the entire character stream simultaneously followed by conflict resolution between agents step. For example, the agents may be employed to consume the character stream in a sequential manner. In so doing, it would be preferred to deploy an agent having the highest priority to consume the character stream first, followed by an agent having the next highest priority, and so on until all the defined agents are deployed. When deploying agents in a sequential manner, subsequent agents may optionally consume only characters which have not yet been consumed by a previously deployed agent to avoid conflicts. It should be recognized that not all characters in the character stream need to be consumed. Specifically, characters that contain no useable information will not typically be consumed. For example, a typical host screen may include a hidden non-input component which is used in the host environment for an application to display private information to specific user's of the application. If the host screen contains these fields, agents need not consume them and thus need not render them for display.

Figure 5:
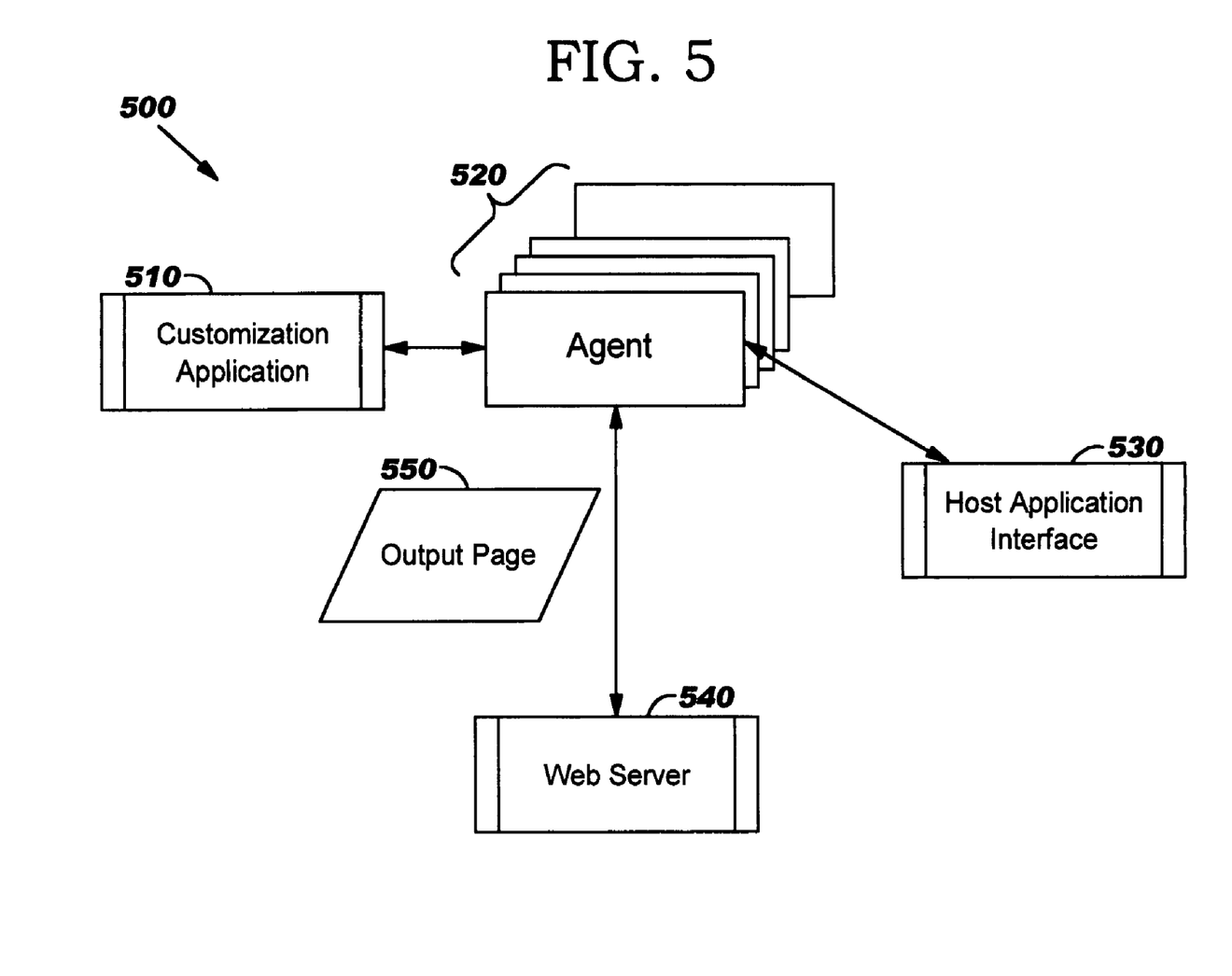
FIG. 5 shows a functional block diagram of software components in accordance with the present invention.

FIG. 5 shows a functional block diagram 500 of the software components which may be employed in a host server 130 in accordance with the present invention. The software components include a set of agents 520, a host application interface 530, a web server 540, and optionally a customization application 510. The interactions of these software components result in a formatted output page 550 which is transmitted to an end user for display by the end user's web browser. The web server 540 includes computer instructions which at least implement the server side responsibilities of a standard communication protocol such as hypertext transfer protocol (HTTP) to deliver virtually all files and other data, collectively called resources, over the network 120, whether the resources are HTML files, XML files, image files, video files, audio files, query results, and the like. IBM's WebSphere® Application Server product, Apache®, or the like may be suitably employed as the web server 540. The host application interface 530 such as the one provided by IBM's Websphere® host on-demand product includes computer instructions which emulate a host terminal session with a host 150. The host application interface 530 further provides program interfaces which are called by the agents 530 to receive a host screen as a stream of characters. The agents 520 which are further described in connection with the discussion of FIG. 6 read the stream of characters searching for a specific host component type for which each specific agent is designed. After each agent consumes the stream of characters and resolves conflicts between consumed regions by different agents, each agent transforms their found host components into a web interface widget by outputting the widget into a page having either HTML, XML, or other suitable format. This output page 550 is delivered to the web server 540 where the web server transmits, in a known manner, the output page 550 over the network 120 to an end user. The optional customization application 510 includes program instructions to modify the behavior of the agents 520. For example, the customization application 510 may instruct the agents on how to resolve conflict as described in FIG. 4C. Other examples of how the customization application controls an agent's behavior include instructing the agents on how the attributes of a transformed web interface widget should be displayed, instructing the agents to limit their search of a host screen to predetermined regions, or the like.

Figure 6:
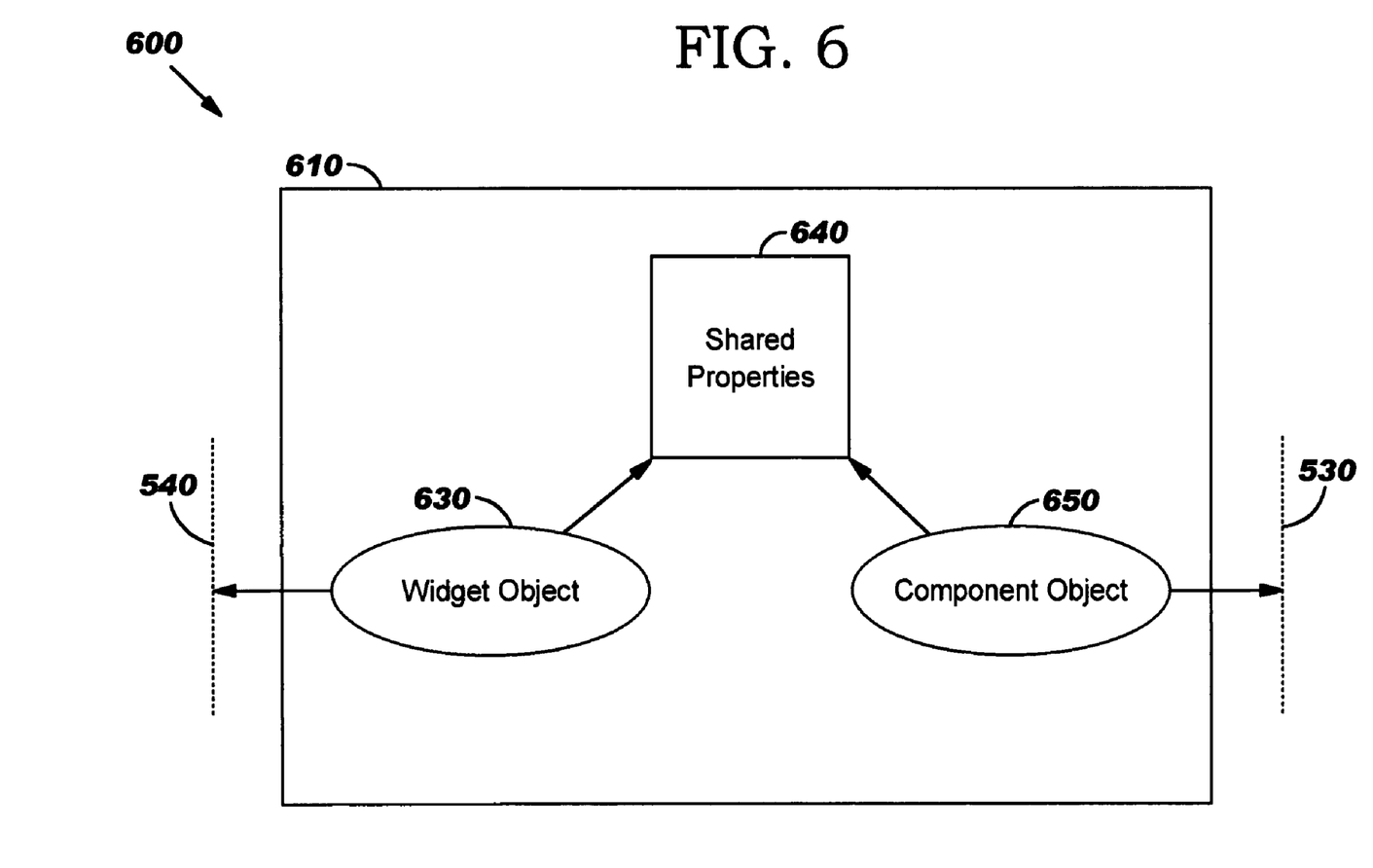
FIG. 6 shows a functional block diagram of an agent in accordance with the present invention.

FIG. 6 shows a functional block diagram 600 of an agent 610 in accordance with the present invention. The agent 610 has a widget object class 630, a component object class 650, and shared memory 640 which temporarily stores shared properties until the properties are no longer used or the agent stops executing. The component object class 650 includes computer instructions to read a character stream through a host interface 530. Furthermore, the component object class 650 includes analysis logic which recognizes the existence of a specific host component within the character stream. This analysis logic varies between different agent implementations. The component object class 650 temporarily stores an indication of each region which is consumed from the read character stream into the shared memory 640. For example, the component object class 650 may store the physical dimensions defining a consumed region or a range of character positions which define the region. Conflicting regions such as region 405 may be determined by an agent manager object requesting each agent's consumed region indications. The manager object would determine if a conflict region exists and dispatches the conflicting agents to resolve the conflict as described in connection with the discussion of FIG. 4C. The component object class 650 also stores data with each region indication in the shared memory 640 for subsequent use by the widget object class 630.

The widget object class 630 includes computer instructions to render a recognized host interface component as a web interface widget. For example, an input field agent's widget object class knows how to render a web interface input field widget. The widget object class 630 utilizes the shared memory 640 to determine where in the outputted format the rendered widget should be located. Furthermore, the widget object class 630 may utilize the data stored in the shared memory 640 to determine any textual content which is rendered with a web interface widget, for example.

Figure 7:
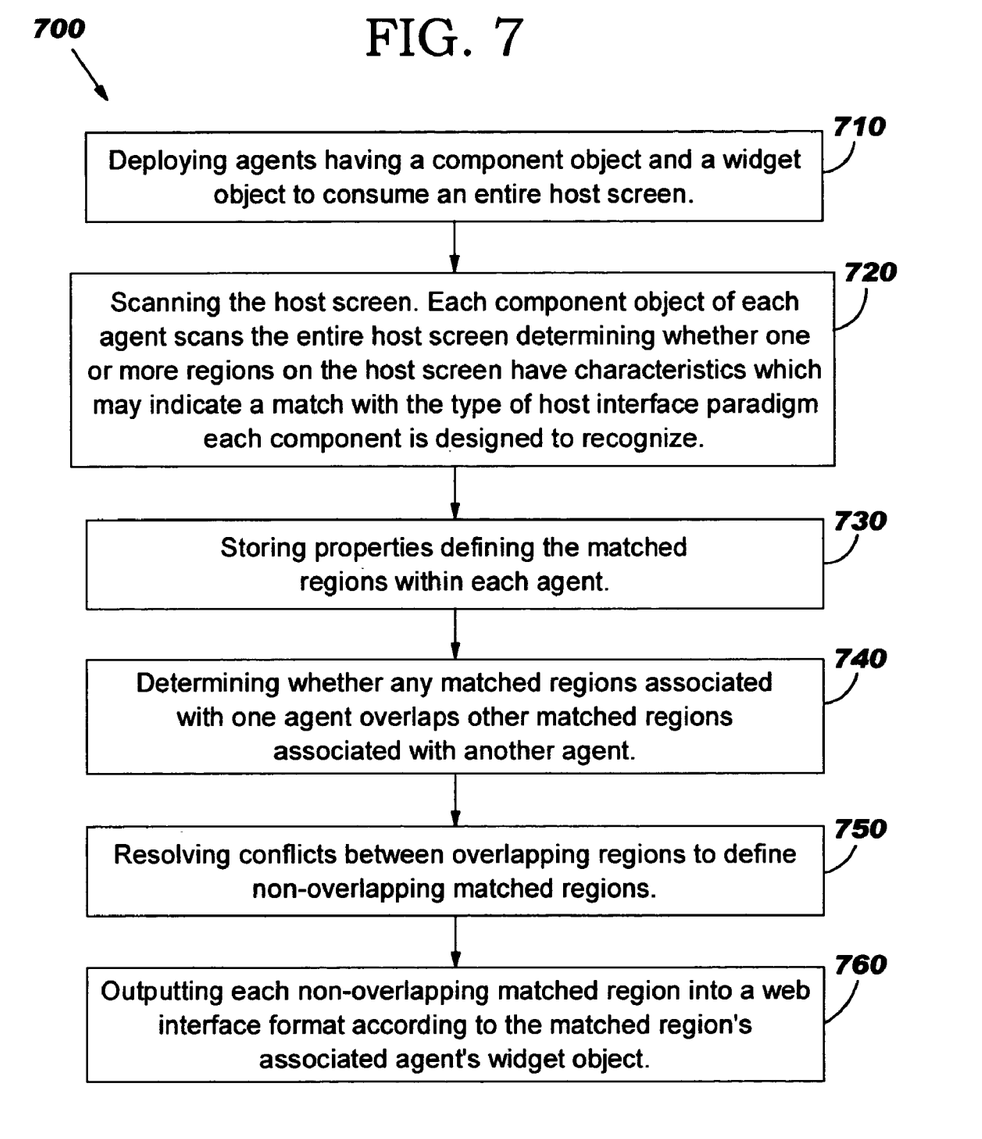
FIG. 7 is a flowchart illustrating a method of recognizing and transforming host user components to web interface widgets in accordance with the present invention.

FIG. 7 is a flowchart illustrating a method 700 of recognizing and transforming host user components to web interface widgets to compose a web enabled user interface which may suitably be read by a web browser. At step 710, agents, such as the agent described in connection with FIG. 6, are employed to consume an entire host screen. At step 720, each component object class of each agent scans the entire host screen determining whether one or more regions on the host screen have characteristics which may indicate a match with the type of host interface component each component is designed to recognize. At step 730, each component object of each agent temporarily stores properties defining any matched regions within the agent. At step 740, the method determines whether any match regions associated with one agent overlaps other matched regions associated with another agent. At step 750, the method resolves conflicts between overlapping regions to define non-overlapping matched regions. At step 760, the method outputs each non-overlapping matched region into a web interface format according to the agent controlling the matched region. Specifically, the controlling agent's widget object specifies the program instructions for rendering the web interface widget.

The description of the present invention has been presented for purposes of illustration and description, and is not intended to be exhaustive or as limiting the invention to the form disclosed. Many modifications and variations will be apparent to those of ordinary skill in the art. The embodiment was chosen and described in order to best explain the principles of the invention, their practical application, and to enable others of ordinary skill in the art to understand the invention. Subject to the limitations of the claims, various embodiments with various modifications as necessary to adapt the present invention to a particular environment or use are hereby contemplated such as rendering XML data into a visual representation, transforming one web interface to another web interface, transforming data carried in an email into data utilized by an automated processing system, transforming data for visual presentation to a user, including without limitation the adaptation of various teachings herein in light of rapidly evolving hardware, software components and techniques for utilizing and adapting such items.

We claim:

1. A program media having stored computer program code that when executed by a computer causes a computer system to recognize a character-based user interface having a plurality of host component types and to transform the character-based user interface to a web enabled user interface, the medium having code to control the computer, the medium comprising:
    code for scanning the character-based user interface by a plurality of agents; code in each agent for determining the existence of a different host component type unique to the agent;
    code for defining a match region for each host component type found to exist by an agent in the character-based user interface;
    code for determining whether two or more match regions overlap;
    code for resolving a conflict between the two or more match regions that overlap;
    code for rendering match regions associated with each agent to compose the web enabled user interface
    and code for rendering each match region as a widget, the aggregated widgets composing a formatted output page.

2. The program media of claim 1 wherein the resolving code is executed before the rendering code, and further comprises:
    code for resolving a conflict between two or more match regions which overlap based on a policy to determine which agent associated with a match region controls the overlap region.

3. The program media of claim 2 wherein the resolving code further comprises:
    code for assigning a predetermined priority to each agent;
    code for comparing the predetermined priority to resolve a conflict between two or more match regions; and
    code for selecting the agent with the highest predetermined priority to control the overlapping region.

4. The program media of claim 2 wherein the resolving code further comprises:
    code for comparing the size of the conflicting regions which overlap; and
    code for selecting the agent having the smaller size region to control the overlapped region.

5. The program media of claim 2 wherein the resolving code further comprises:
    code for assigning a dynamic priority to each conflicting region having a common overlapping region, the dynamic priority based on the projected amount of time expended to render each conflicting region; and
    code for selecting the agent controlling the conflicting region having the highest priority to retain control over the overlapping region.

6. The program media of claim 3 further comprising code for controlling the agents detecting overlapping match regions to negotiate whether to relinquish control of each agent's overlap region.

7. A computer system for recognizing a character-based user interface having a plurality of host component types and transforming the character-based user interface to a web enabled user interface, the computer system comprising:
    a memory comprising a plurality of agent objects to scan the character-based user interface, each agent object determining the existence of a different host component type from the other agents, each agent object defining a match region for each host component type found to exist in the character-based user interface,
    an agent manager for determining whether two or more match regions overlap and for resolving the overlap, each agent object rendering its associated match region to compose the web enabled user interface;
    each agent is configured to render each match region as a widget, the aggregated widgets composing a formatted output page;
    and a processor for running the plurality of agent objects.

8. The computer system of claim 7 wherein the system is configured to resolve a conflict between two or more overlapping match regions based on a policy to determine which agent associated with one match region controls the overlap region, the processor configured to execute the policy.

9. The computer system of claim 8 wherein the policy executed by the processor comprises:
    assigning a predetermined priority to each agent; comparing the predetermined priority of the two or more agents detecting overlapping match regions; and selecting the agent with the highest predetermined priority to control the overlapping region.

10. The computer system of claim 8 wherein the policy executed by the processor comprises:
    comparing the size of the conflicting regions which overlap; and
    selecting the agent having the smaller size region to control the overlapped region.

11. The computer system of claim 8 wherein the policy executed by the processor comprises:
    assigning a dynamic priority to each conflicting region having a common overlapping region, the dynamic priority based on the projected amount of time expended to render each conflicting region; and
    selecting the agent controlling the conflicting region having the highest priority to retain control over the overlapping region.

12. A method for recognizing a character-based user interface having a plurality of host component types and transforming the character-based user interface to a web enabled user interface, the method comprising:
    scanning the character-based user interface by a plurality of agents; determining which host component types exist in the character-based user interface, each agent determining the existence of a different host component type from the other agents;
    defining a match region for each host component type found to exist by an agent in the character-based user interface; determining whether two or more match regions overlap; upon a determination that two or more match regions overlap, resolving a conflict between said two or more match regions that overlap; rendering match regions associated with each agent to compose the web enabled user interface; and rendering each match region as a widget, the aggregated widgets composing a formatted output page.

13. The method of claim 12 wherein resolving a conflict between said two or more match regions that overlap further comprises:
resolving a conflict between two or more match regions based on a policy to determine which agent associated with a match region controls the overlap region.

14. The method of claim 13 wherein the policy comprises assigning a predetermined priority to each agent; comparing the predetermined priority of the two or more agents detecting overlapping match regions; and selecting the agent with the highest predetermined priority to control the overlapping region.

15. The method of claim 13 wherein the policy comprises comparing the size of the conflicting regions which overlap; and selecting the agent having the smaller size region to control the overlapped region.

16. The method of claim 13 wherein the policy comprises the
assigning a dynamic priority to each conflicting region having a common overlapping region, the dynamic priority based on the projected amount of time expended to render each conflicting region; and selecting the agent controlling the conflicting region having the highest priority to retain control over the overlapping region.

17. The method of claim 14 wherein the agents detecting overlapping match regions negotiate whether to relinquish control of each agent's overlap region.

* * * * *